United States Patent
Collins et al.

(10) Patent No.: US 7,250,141 B2
(45) Date of Patent: Jul. 31, 2007

(54) AUGMENTED CATALYTIC HEAT EXCHANGER SYSTEM

(75) Inventors: Peter C. Collins, Foothill Ranch, CA (US); Felipe A. Fuentes, Harbor City, CA (US); Michel A. Jonqueres, Torrance, CA (US); Jim A. Emerick, Woodland Hills, CA (US)

(73) Assignee: Honeywell International, Inc., Morristown, NJ (US)

( * ) Notice: Subject to any disclaimer, the term of this patent is extended or adjusted under 35 U.S.C. 154(b) by 538 days.

(21) Appl. No.: 10/789,692

(22) Filed: Feb. 27, 2004

(65) Prior Publication Data

US 2005/0191223 A1    Sep. 1, 2005

(51) Int. Cl.
*B01D 50/00* (2006.01)
(52) U.S. Cl. .................... 422/177; 422/180
(58) Field of Classification Search ............ 422/177, 422/180
See application file for complete search history.

(56) References Cited

U.S. PATENT DOCUMENTS

| | | | |
|---|---|---|---|
| 3,819,934 A | 6/1974 | Yoshida et al. |
| 4,665,973 A | 5/1987 | Limberg et al. |
| 4,755,360 A | 7/1988 | Dickey et al. |
| 5,151,022 A | 9/1992 | Emerson et al. |
| 5,860,283 A | 1/1999 | Coleman et al. |
| 5,891,584 A | 4/1999 | Coffinberry |
| 6,576,199 B1 | 6/2003 | Liu et al. |
| 6,629,428 B1 | 10/2003 | Murry |
| 2003/0014865 A1 | 1/2003 | Nowak et al. |
| 2003/0188850 A1 | 10/2003 | Liu et al. |

*Primary Examiner*—Glenn Caldarola
*Assistant Examiner*—Tom P. Duong
(74) *Attorney, Agent, or Firm*—Oral Caglar, Esq.

(57) ABSTRACT

Systems, apparatus, and methods for the catalytic removal of at least one pollutant from an air stream via a catalytic precooler arranged in series with at least one augmentative catalytic device. The augmentative catalytic device may be located upstream or downstream from the catalytic precooler. The augmentative catalytic device may be integrated with the catalytic precooler, thereby eliminating the need for a separate housing and minimizing weight. Alternatively, the augmentative catalytic device may be disposed within a separate housing, thereby facilitating access for maintenance and decreasing direct maintenance costs.

6 Claims, 7 Drawing Sheets

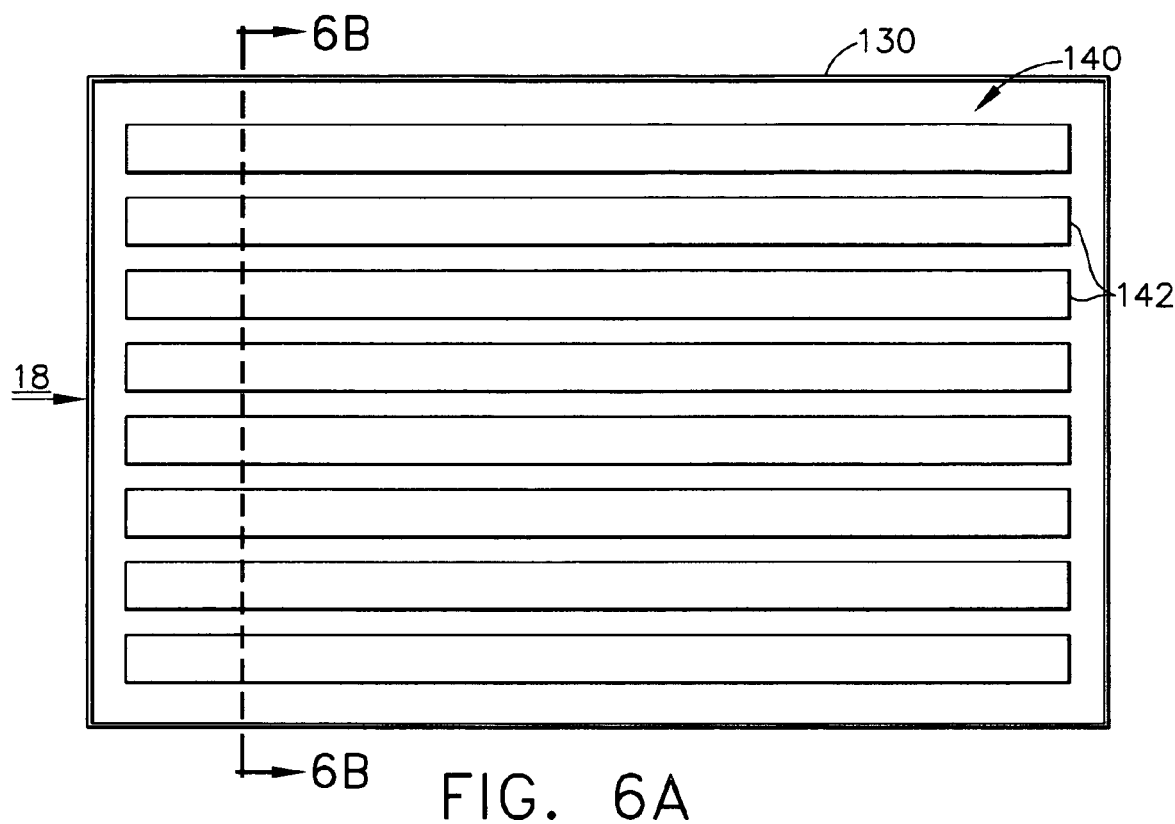
FIG. 6A
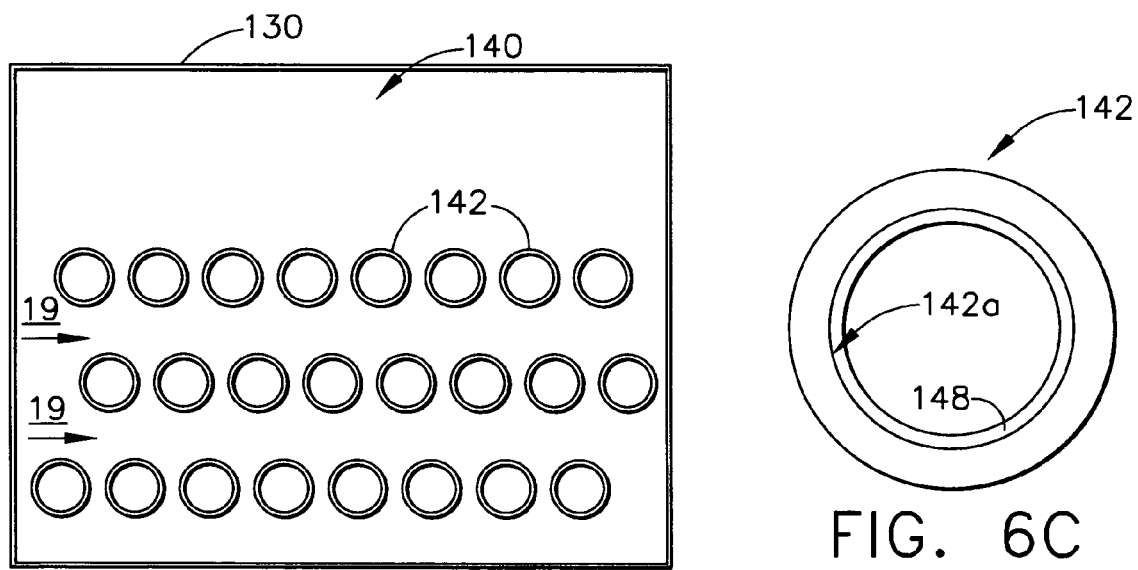
FIG. 6B
FIG. 6C

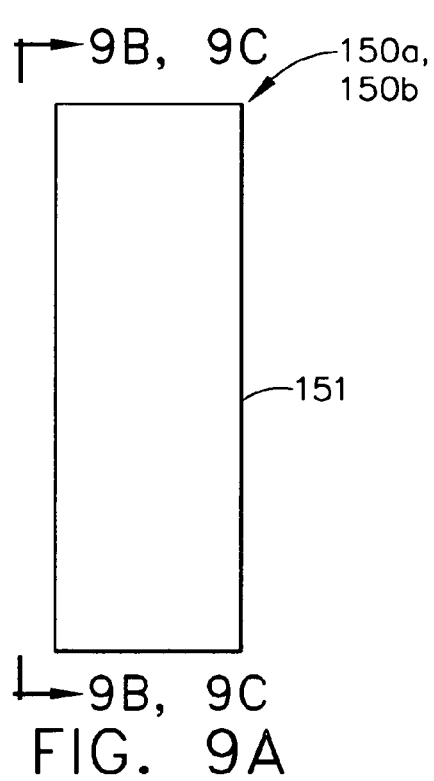
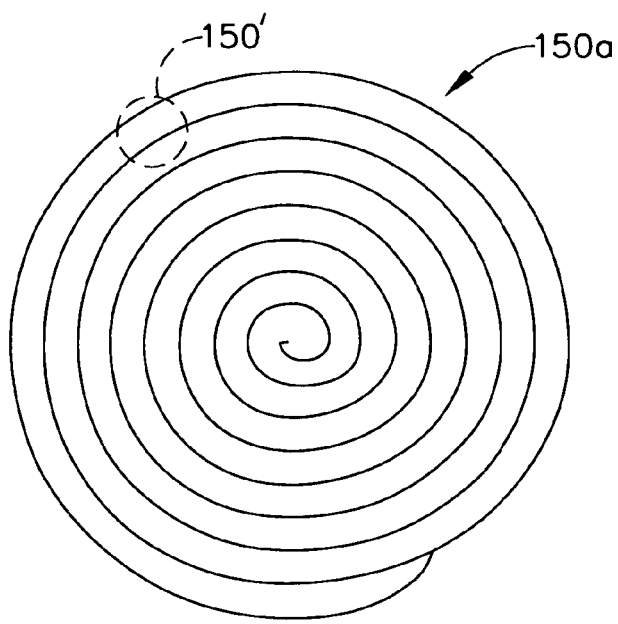
FIG. 9B
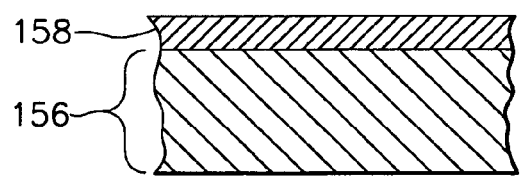
FIG. 9E
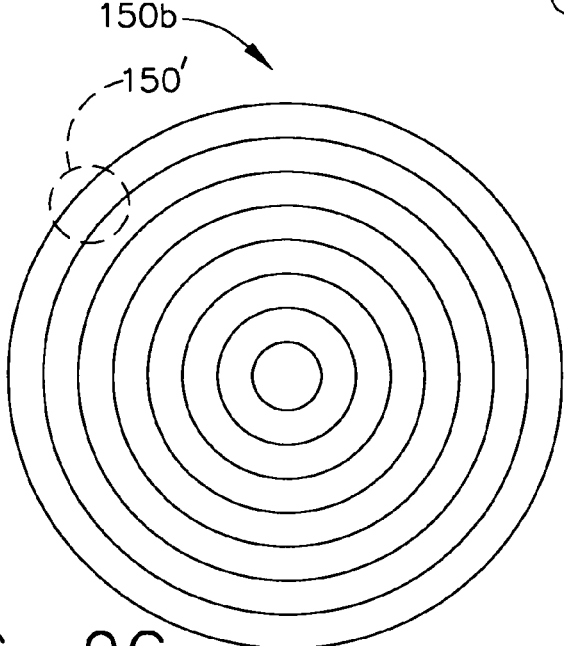
FIG. 9C
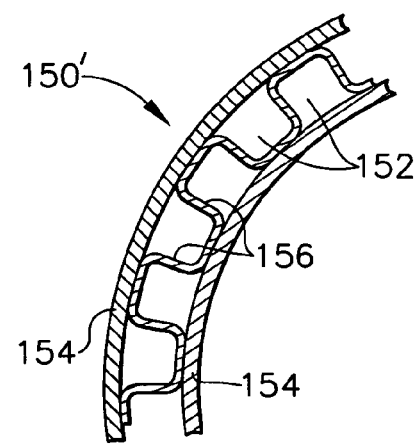
FIG. 9D
FIG. 9A

AUGMENTED CATALYTIC HEAT EXCHANGER SYSTEM

BACKGROUND OF THE INVENTION

The present invention generally relates to an environmental control system, and more particularly, to an augmented catalytic heat exchanger system and method for removing one or more pollutants from an air stream.

Commercial aircraft feed bleed air from a gas turbine engine to an environmental control system (ECS) and thence to an interior air space, e.g., cabin or flight deck of the aircraft. The ECS conditions the air it receives in terms of pressure, temperature, and humidity to provide for the comfort of flight crew and passengers.

Modern jet (gas turbine engine) aircraft are typically designed for fuel-efficient operation at relatively high altitudes of 25,000 feet or more where the atmospheric ozone content is relatively high. The ozone concentration may depend on a number of factors, such as the altitude, geographic location, time of year, etc. The ozone concentration in the atmosphere is typically in the range of from about 0.2 to 2.0 ppm. The upper limit permitted by FAA regulations for the ozone concentration in cabin air of commercial aircraft is 0.1 ppm. Excessive levels of ozone can cause a number of medical problems, including lung and eye irritation, headaches, fatigue, and breathing discomfort.

In the prior art, vehicular environmental control systems have used a catalytic converter for the removal of ozone, wherein the catalytic converter is a stand-alone device, thereby adding weight to the ECS. Adding weight to the ECS may be a major disadvantage, particularly in the case of aircraft. A stand-alone catalytic converter may also cause an undesirable pressure drop across the system. Furthermore, due to the relatively low surface area of conventional catalytic converters, the maintenance period is relatively short, and direct maintenance costs are consequently relatively high.

U.S. Pat. No. 5,151,022 to Emerson et al. discloses an ECS for a vehicle for removing nuclear, biological, and chemical warfare agents from air, wherein the ECS includes a primary heat exchanger and a catalytic converter as a separate device.

U.S. Pat. No. 4,665,973 to Limberg et al., discloses an ECS including a catalytic heat exchanger for the removal of ozone. However, Limberg et al. does not disclose an ancillary or augmentative catalytic device to be used in conjunction with the catalytic heat exchanger. Consequently, due to the relatively low catalytic conversion efficiency, for example about 60%, of a stand-alone catalytic heat exchanger, the ECS of Limberg et al. may fail to meet FAA regulations on ozone concentration in cabin air, or may require frequent maintenance to boost the catalytic conversion efficiency to a point sufficient to meet such FAA regulations.

FIG. 1A schematically represents, in side view, a portion of an ECS 10 for a vehicle (not shown), including a primary heat exchanger 12 and a stand-alone catalytic converter 14, according to the prior art. An air stream 18 may be passed through primary heat exchanger 12, which cools the air but does not remove ozone from air stream 18, and thence, via a conduit 16, to catalytic converter 14, which removes one or more pollutants from air stream 18. In the case of a commercial aircraft, primary heat exchanger 12 and catalytic converter 14 may have a weight of about 44 Kg and 5.8 Kg, respectively.

FIG. 1B schematically represents, in side view, a portion of an ECS 10' for a vehicle (not shown), including a stand-alone catalytic primary heat exchanger 12', also according to the prior art. An air stream 18 may be passed through catalytic primary heat exchanger 12,' which both cools the air and catalytically removes one or more pollutants.

A disadvantage with the prior art system of FIG. 1A is that the combined weight of primary heat exchanger 12 and catalytic converter 14 greatly exceed that of a catalytic heat exchanger (e.g., catalytic heat exchanger 12' of FIG. 1B). A further disadvantage with the prior art system of FIG. 1A is that the catalytic efficiency, e.g., the ozone conversion efficiency, may decrease over a relatively short operation period, such that extensive maintenance of catalytic converter 14 is required within a period of from about 9,000 to 22,000 hours.

A disadvantage of catalytic heat exchanger 12' of FIG. 1B is that the catalytic efficiency, e.g., the ozone conversion efficiency, may be considerably less than that of the prior art system of FIG. 1A.

As can be seen, there is a need for an ECS including a catalytic primary heat exchanger or catalytic precooler, which exhibits catalytic activity for the destruction of ozone, in combination with an ancillary or augmentative catalytic device also for the destruction of ozone, wherein the weight of the augmentative catalytic device is less than that of prior art stand-alone catalytic converters. Because the augmentative catalytic device may be smaller in size than a stand-alone catalytic converter, any pressure drop within the system may be mitigated.

There is also a need for a catalytic heat exchanger system having a catalytic precooler in series with an augmentative catalytic device, wherein each of the catalytic precooler and the augmentative catalytic device are adapted for ozone removal from an air stream, and wherein the total weight of the catalytic heat exchanger system is less than the combined weight of a non-catalytic precooler and a stand-alone catalytic converter of the prior art.

There is a further need for a catalytic heat exchanger system having a catalytic precooler in series with an augmentative catalytic device, wherein the overall ozone conversion efficiency of the catalytic heat exchanger system is at least about 85% after 30,000 hours of operation, and wherein the direct maintenance cost for the catalytic heat exchanger and ancillary catalytic device is less than that of prior art stand-alone catalytic converters.

SUMMARY OF THE INVENTION

In one aspect of the present invention, there is provided catalytic heat exchanger system, for removing at least one pollutant from an air stream, comprising a first housing, a catalytic precooler disposed within the first housing, and an augmentative catalytic device disposed in series with the catalytic precooler. Each of the catalytic precooler and the augmentative catalytic device is adapted for passage of an air stream therethrough, and each of the catalytic precooler and the augmentative catalytic device is adapted for removal of the pollutant from the air stream.

In another aspect of the present invention, there is provided a catalytic heat exchanger system comprising a first housing, a catalytic precooler disposed within the first housing, a second housing, and an augmentative catalytic device disposed within the second housing. The augmentative catalytic device is disposed in series with the catalytic precooler, each of the catalytic precooler and the augmentative catalytic device is adapted for passage of an airstream therethrough, and each of the catalytic precooler and the augmentative catalytic device is independently capable of catalytic ozone conversion.

In still another aspect of the present invention, there is provided a catalytic heat exchanger system, for the removal of at least one pollutant from an air stream, comprising a first housing, a catalytic precooler disposed within the first housing, wherein the catalytic precooler comprises a plurality of hot pass passages arranged longitudinally within the first housing, a first catalyst support disposed within the plurality of hot pass passages, and at least one catalyst disposed on or within the first catalyst support. The catalytic heat exchanger system may further comprise an augmentative catalytic device disposed in series with the catalytic precooler, wherein the augmentative catalytic device comprises a plurality of channels, and a second catalyst support disposed within the plurality of channels, the at least one catalyst disposed on or within the second catalyst support, and the at least one catalyst adapted for catalytic ozone conversion. The augmentative catalytic device may have a circular configuration, such as a spiral configuration or a concentric ring configuration. The plurality of channels may be straight channels or off-set channels, and the catalytic precooler and the augmentative catalytic device may have a combined ozone conversion efficiency of at least about 85% after operation of the catalytic heat exchanger system for a period of about 30,000 hours.

In yet another aspect of the present invention, there is provided an environmental control system, for providing conditioned air to a cabin of a vehicle, comprising a catalytic heat exchanger system adapted for removing at least one pollutant from an air stream, and the catalytic heat exchanger system further adapted for cooling the air stream. The catalytic heat exchanger system may further comprise at least one duct coupled to the catalytic heat exchanger system for providing the air stream to the catalytic heat exchanger system from a compressed air source. The catalytic heat exchanger system may comprise a catalytic precooler disposed within a first housing, and an augmentative catalytic device disposed in series with the catalytic precooler.

In a further aspect of the present invention, there is provided a vehicle comprising at least one environmental control system for providing conditioned air to a cabin of the vehicle, and at least one compressed air source for providing an air stream to the at least one environmental control system, wherein the environmental control system comprises a catalytic heat exchanger system adapted for cooling the air stream and for catalytically removing at least one pollutant from the air stream. The catalytic heat exchanger system may comprise a catalytic precooler disposed within a first housing, and an augmentative catalytic device disposed in series with the catalytic precooler, wherein each of the catalytic precooler and the augmentative catalytic device is independently capable of catalytic ozone conversion.

In still a further aspect of the present invention, there is provided a method for providing cleansed air to a cabin of a vehicle, the method comprising providing an airstream from a compressor, passing the airstream through a first catalytic device, and thereafter passing the airstream through a second catalytic device, wherein the second catalytic device is arranged in series with the first catalytic device, and wherein each of the first catalytic device and the second catalytic device is independently capable of catalytic ozone conversion.

These and other features, aspects and advantages of the present invention will become better understood with reference to the following drawings, description and claims.

BRIEF DESCRIPTION OF THE DRAWINGS

FIGS. 6A-B are a longitudinal sectional view and a transverse sectional view, respectively, schematically representing a catalytic precooler, according to one embodiment of the invention;

FIG. 6C is a transverse sectional view schematically representing a hot pass passage of the catalytic precooler of FIGS. 6A-B, according to the invention;

FIG. 9A is a side view schematically representing an augmentative catalytic device adapted for catalytic ozone removal, according to one embodiment of the invention;

FIGS. 9B and 9C are axial views schematically representing the augmentative catalytic device of FIG. 9A, according to two alternative embodiments of the invention;

FIG. 9D is an enlarged axial view of the augmentative catalytic device of FIG. 9A showing a plate-fin configuration, according to one embodiment of the invention;

FIG. 9E is an enlarged sectional view of a portion of a fin of the augmentative catalytic device of FIG. 9A, including a catalyst support disposed on the fin, according to one embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus, systems, and methods for removing at least one pollutant from an air stream, and for providing cleansed air to an interior air space. As an example, the present invention may be used to remove ozone from an air stream provided by a compressor of a vehicle, and for providing cleansed air to an interior air space of the vehicle, such as a cabin or flight deck of a commercial aircraft. The cleansed air may be provided by passing the air stream through a catalytic heat exchanger system of an environmental control system (ECS) of the present invention. The air stream may be derived, for example, from engine bleed air (i.e., air provided by the compressor of a gas turbine engine), or from a dedicated ambient air compressor.

An air stream to be supplied to an interior air space of an aircraft may contain various pollutants, such as ozone, VOCs, or carbon monoxide, and the like. Ozone may be present in the air stream at levels well above the maximum level (presently 0.1 ppm) permitted by the FAA. In the case of an air stream derived from an air intake unit of an aircraft, the ozone concentration may typically be in the range of from about 0.2 to 2.0 ppm, depending on factors such as geographic location, the time of year, and the altitude.

Environmental control systems of the prior art have used either a non-catalytic primary heat exchanger in combination with a separate, stand-alone catalytic converter, or a catalytic primary heat exchanger alone (i.e., in the absence of a catalytic converter per se), for the removal of pollutants from air.

In contrast to the prior art, apparatus and systems of the present invention solve the problems associated with prior art apparatus and systems by providing a catalytic heat exchanger system which incorporates a catalytic precooler or primary heat exchanger in combination with an augmentative catalytic device, wherein both the catalytic precooler and the augmentative catalytic device are independently adapted for removal from air of a pollutant, such as ozone, whereby the maintenance period may be extended to at least about 30,000 hours of operation, while maintaining an ozone conversion efficiency of at least about 85%.

Figure 2:
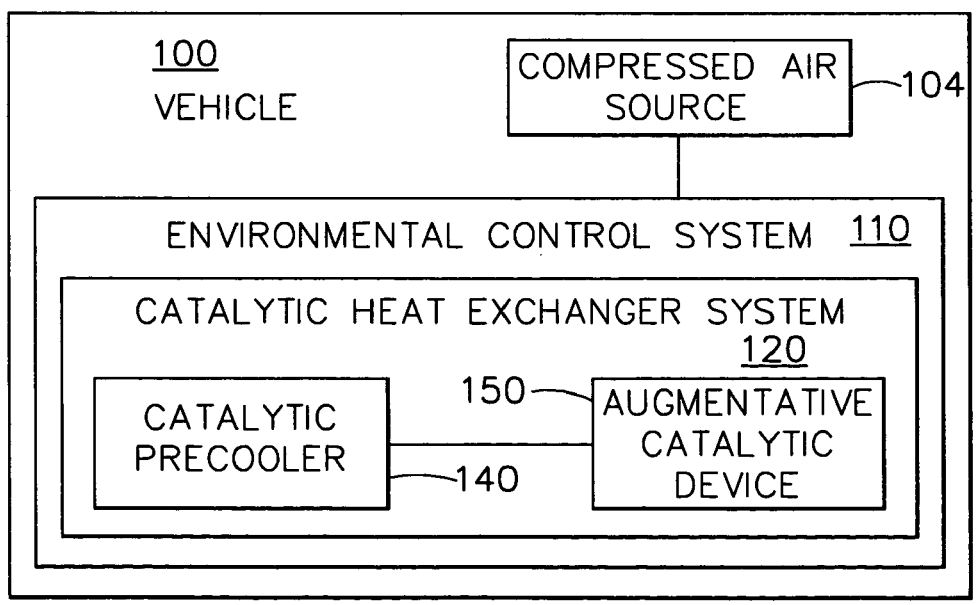
FIG. 2 is a block diagram schematically representing a vehicle including a catalytic heat exchanger system, according to one embodiment of the invention.

FIG. 2 is a block diagram schematically representing a vehicle 100 including a compressed air source 104 and an ECS 110, according to one embodiment of the invention. As an example, vehicle 100 may comprise a commercial aircraft, and ECS 110 may provide conditioned air to the cabin of vehicle 100. Alternatively, vehicle 100 may comprise a land vehicle. Compressed air source 104 may provide an air stream 18 (see, e.g., FIGS. 4A-5B) to ECS 110. Compressed air source 104 may comprise a compressor of a gas turbine engine or a dedicated air compressor (neither of which are shown).

Again with reference to FIG. 2, ECS 110 may include a catalytic heat exchanger system 120. Catalytic heat exchanger system 120 may comprise a catalytic precooler or primary heat exchanger 140 coupled to an augmentative catalytic device 150. Both catalytic precooler 140 and augmentative catalytic device 150 may be adapted for the passage of air stream 18 therethrough. Catalytic precooler 140 and augmentative catalytic device 150 may be coupled to each other in series. The flow rate of air stream 18 may typically be in the range of from about 20 to 400 pounds of air per minute, and usually from about 150 to 350 pounds per minute.

Each of catalytic precooler 140 and augmentative catalytic device 150 may be adapted for the independent catalytic decomposition of ozone (or ozone conversion), that is to say, both catalytic precooler 140 and augmentative catalytic device 150 may catalytically decompose ozone independently of each other. Typically, ozone may be catalytically converted to molecular oxygen via catalytic heat exchanger system 120.

Each of catalytic precooler 140 and augmentative catalytic device 150 may have an initial ozone conversion efficiency of at least about 80%. The initial ozone conversion efficiency may be considered to be a typical ozone conversion efficiency when catalytic heat exchanger system 120 is first used. The ozone conversion efficiency of both catalytic precooler 140 and augmentative catalytic device 150 typically decreases over time, and specifically following operation of catalytic heat exchanger system 120, e.g., during flight of an aircraft. However, each of catalytic precooler 140 and augmentative catalytic device 150 may typically have a second ozone conversion efficiency of at least about 60% after a period of operation of catalytic heat exchanger system 120 of about 30,000 hours, wherein the second ozone conversion efficiency maybe considered to be an ozone conversion efficiency after operation of catalytic heat exchanger system 120 for a defined period of time, in this instance 30,000 hours.

Figure 1A:
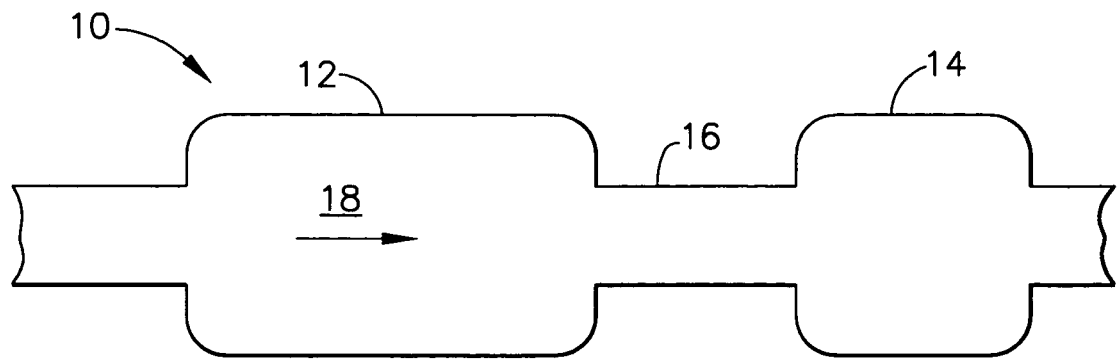
FIG. 1A schematically represents, in side view, a portion of an environmental control system for a vehicle, including a primary heat exchanger coupled to a stand-alone catalytic converter, according to the prior art.
Figure 1B:
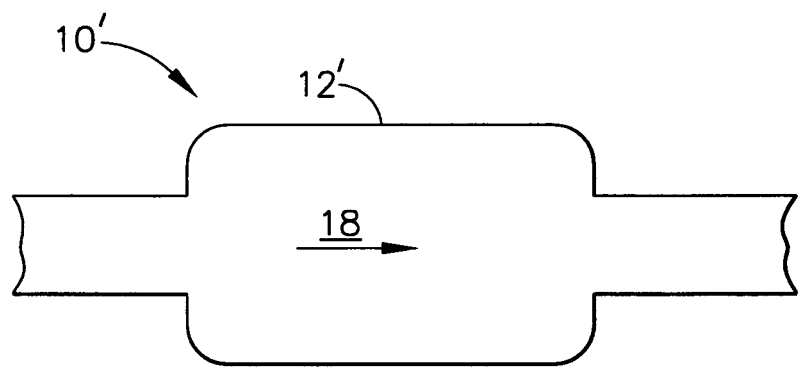
FIG. 1B schematically represents, in side view, a portion of an environmental control system for a vehicle, including a stand-alone catalytic primary heat exchanger, also according to the prior art.

In the case of a commercial aircraft, augmentative catalytic device 150 may have a weight typically in the range of from about 2.0 Kg to 4.0 Kg, and usually from about 2.5 Kg to 4.0 Kg. Catalytic precooler 140 may have a weight similar to that of primary heat exchanger 12 (see FIG. 1A), for example, about 44 to 45 Kg.

ECS 110 may further include one or more secondary or tertiary heat exchangers, dehumidifiers, water traps, condensers, and/or additional elements, for example, as described in U.S. Pat. No. 4,655,973, the disclosure of which is incorporated by reference herein in its entirety.

Figure 3A:
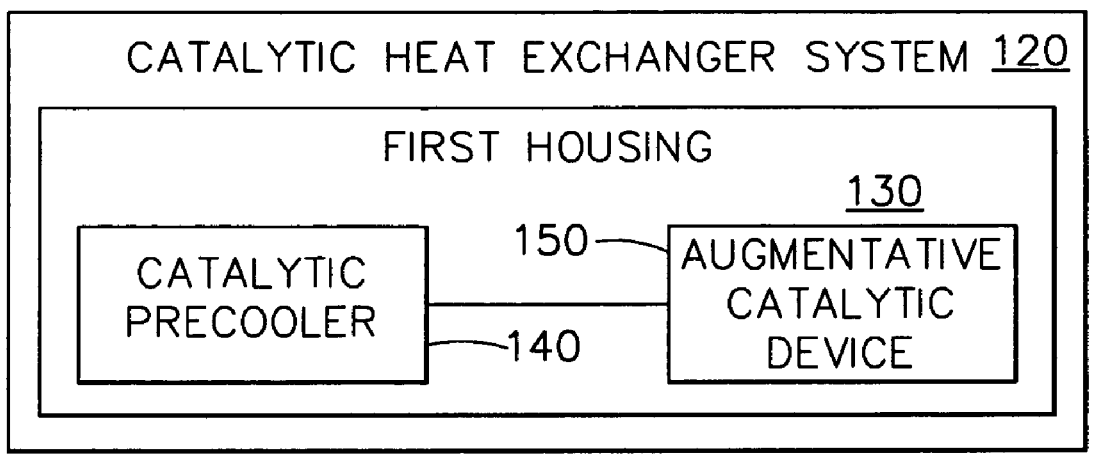
FIGS. 3A-B are block diagrams, each schematically representing a catalytic heat exchanger system, according to two alternative embodiments of the invention.
Figure 3B:
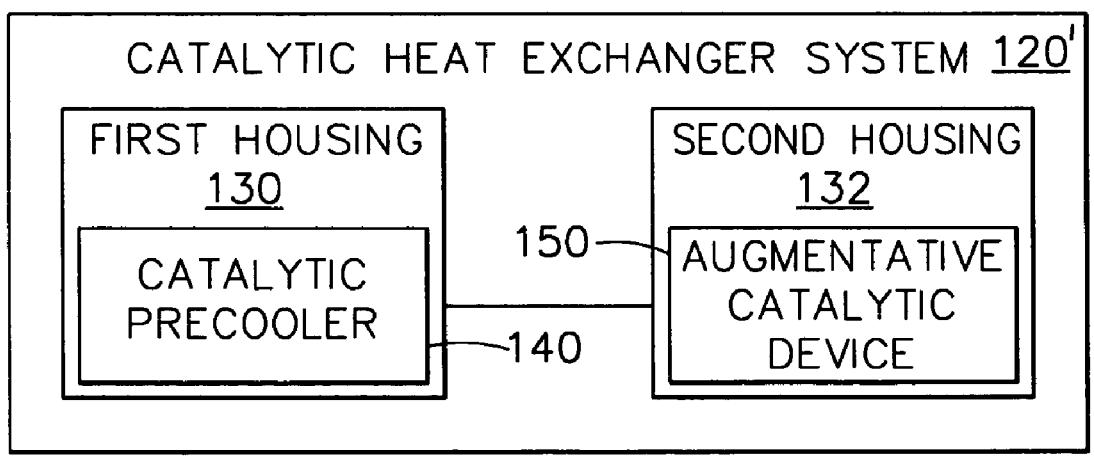

FIGS. 3A-B are block diagrams, each schematically representing a catalytic heat exchanger system, according to two alternative embodiments of the invention. Thus, FIG. 3A shows a catalytic heat exchanger system 120 including a first housing 130, wherein both catalytic precooler 140 and augmentative catalytic device 150 are disposed within first housing 130. In the embodiment of FIG. 3A, augmentative catalytic device 150 may be located either upstream or downstream from catalytic precooler 140.

FIG. 3B shows a catalytic heat exchanger system 120' including first housing 130 and a second housing 132, wherein catalytic precooler 140 is disposed within first housing 130, while augmentative catalytic device 150 is disposed within second housing 132. In the embodiment of FIG. 3B, augmentative catalytic device 150 may be located either upstream or downstream from catalytic precooler 140.

Figure 4A:
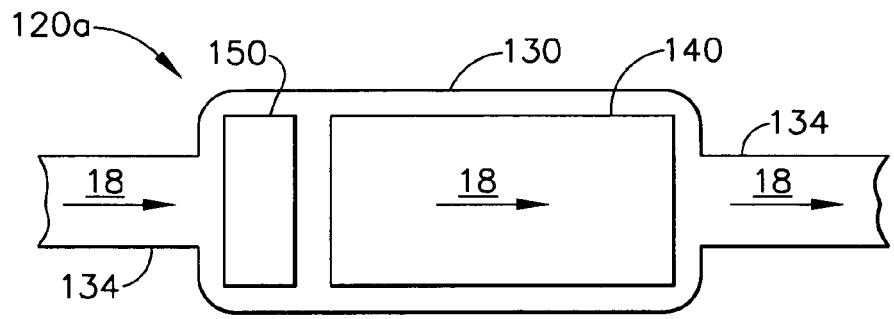
FIGS. 4A-B each schematically represent, in longitudinal sectional view, a catalytic heat exchanger system having a catalytic precooler and an augmentative catalytic device within a single housing, according to two alternative embodiments of the invention.
Figure 4B:
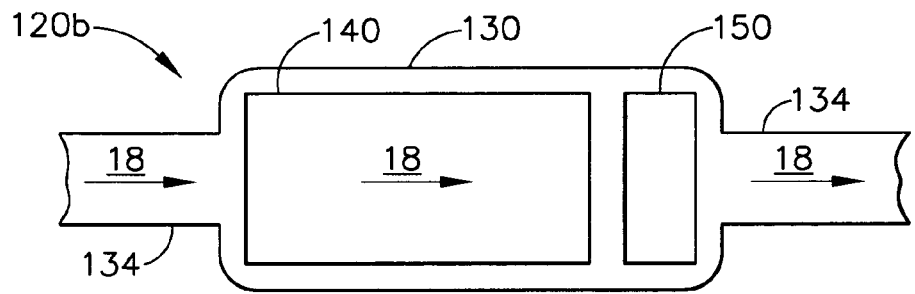

FIGS. 4A-B each schematically represent a catalytic heat exchanger system 120a, 120b respectively, as seen in longitudinal sectional view, having catalytic precooler 140 and augmentative catalytic device 150 within a single (first) housing 130, according to two alternative embodiments of the invention. By accommodating both catalytic precooler 140 and augmentative catalytic device 150 within a single housing 130, considerable weight savings may be achieved.

In the embodiment of FIG. 4A, catalytic heat exchanger system 120a includes augmentative catalytic device 150 located upstream from catalytic precooler 140. In contrast, catalytic heat exchanger system 120b of FIG. 4B includes augmentative catalytic device 150 located downstream from catalytic precooler 140. At least one duct 134 may be coupled to catalytic heat exchanger system 120a, e.g:, for providing air stream 18 to first housing 130 from compressed air source 104 (see, e.g., FIG. 2). In FIGS. 4A-B the direction of flow of airstream 18 is indicated by the arrow.

With further reference to FIGS. 4A-B, catalytic heat exchanger system 120a, 120b, catalytic precooler 140, and augmentative catalytic device 150 may have those characteristics and elements as described hereinabove, e.g., with reference to FIGS. 2, 3A-B. First housing 130 may be coupled to other elements of ECS 110 (see FIG. 2) via the at least one duct 134.

In the case of an air stream 18 which may be provided from bleed air from the compressor of a gas turbine engine, the temperature of air stream 18 upstream of catalytic precooler 140 may typically be in the range of from about 400 to 1000° F., and usually from about 600 to 800° F.; while the temperature of air stream 18 downstream of catalytic precooler 140 may typically be in the range of from about 200 to 450° F., and usually from about 300 to 400° F.

In the case of catalytic heat exchanger system 120a (FIG. 4A) augmentative catalytic device 150 may include a catalyst, or catalyst mixture, suited to a relatively high temperature of air stream 18 at a location upstream from catalytic precooler 140. In general, overall ozone conversion efficiency may be greater when augmentative catalytic device 150 is upstream from catalytic precooler 140 due to the higher air temperature. In contrast, in the case of catalytic heat exchanger system 120b (FIG. 4B) augmentative catalytic device 150 may include a catalyst, or catalyst mixture, suited to a relatively low temperature of air stream 18 at a location downstream from catalytic precooler 140. Further, in situations where contamination of augmentative catalytic device 150 may be anticipated as a potential problem, the downstream location shown in FIG. 4B may be selected.

Figure 5A:
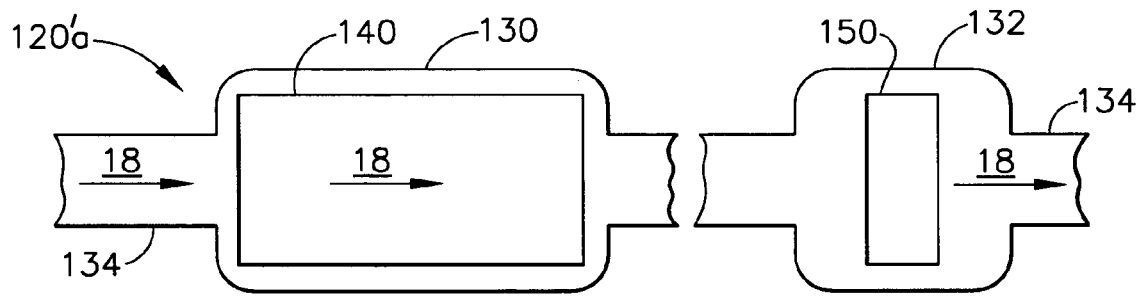
FIGS. 5A-B each schematically represent, in longitudinal sectional view, a catalytic heat exchanger system having a catalytic precooler and an augmentative catalytic device within separate housings, according to two alternative embodiments of the invention.
Figure 5B:
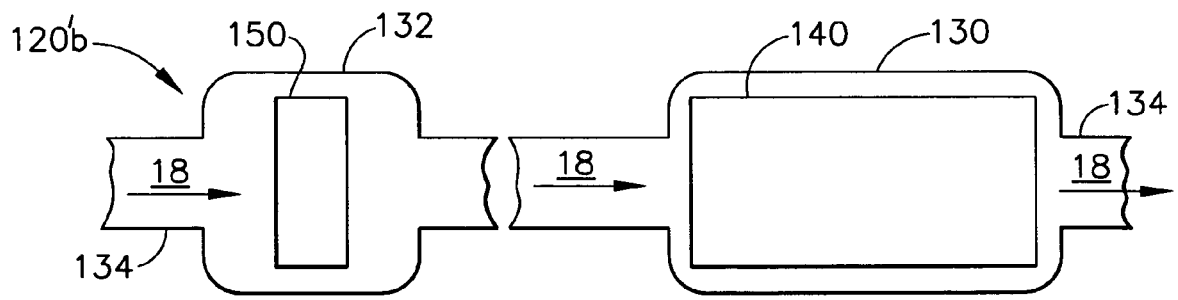

FIGS. 5A-B each schematically represent a catalytic heat exchanger system 120'a, 120'b, respectively, as seen in longitudinal sectional view, according to two alternative embodiments of the invention. In catalytic heat exchanger system 120'a of FIG. 5A, catalytic precooler 140 and augmentative catalytic device 150 may be housed within a first housing 130 and a second housing 132, respectively, wherein augmentative catalytic device 150 and second housing 132 may be located downstream from catalytic precooler 140 and first housing 130.

In catalytic heat exchanger system 120'b of FIG. 5B, catalytic precooler 140 and augmentative catalytic device 150 may be again housed within a first housing 130 and a second housing 132, respectively. However, in the embodiment of FIG. 5B, augmentative catalytic device 150 and second housing 132 may be located upstream from catalytic precooler 140 and first housing 130. The temperature of air stream 18 may vary according to an upstream or downstream location with respect to catalytic precooler 140, generally as described hereinabove with reference to FIGS. 4A-B. By locating augmentative catalytic device 150 either upstream or downstream from catalytic precooler 140, a temperature of air stream 18 best suited to the catalytic activity exhibited by augmentative catalytic device 150 may be selected.

FIG. 6A is a longitudinal sectional view of a catalytic precooler 140 comprising a plurality of hot pass passages 142, according to one embodiment of the invention, wherein each of hot pass passages 142 may be in the form of a cylinder arranged longitudinally within first housing 130. The direction of flow of air stream 18 is indicated by the arrow as being parallel to hot pass passages 142. Each of the plurality of hot pass passages 142 may comprise a ceramic, such as cordierite (magnesium aluminum silicate); or a metal such as steel, aluminum, an aluminum alloy, titanium, or a titanium alloy, and the like. In alternative embodiments, catalytic precooler 140 may have a crossflow plate-fin configuration or structure (see, e.g., FIG. 7).

FIG. 6B is a transverse sectional view of catalytic precooler 140, for example, as seen along the lines 6B-6B of FIG. 6A. Only three layers or rows of hot pass passages 142 are shown in FIG. 6B for the sake of clarity. In practice, hot pass passages 142 may be distributed both vertically and horizontally throughout first housing 130. The direction of flow of cold fluid 19, may be in a direction substantially orthogonal to the longitudinal axis of first housing 130, as indicated in FIG. 6B by the arrow.

FIG. 6C is an enlarged transverse sectional view of a hot pass passage 142 of catalytic precooler 140 of FIGS. 6A-B, according to the invention. Hot pass passage 142 may include a hot pass passage inner surface 142a. A first catalyst support 148 may be disposed on hot pass passage inner surface 142a. First catalyst support 148 may be porous, and may comprise, for example, a refractory metal oxide, such as alumina, titania, manganese dioxide, or cobalt oxide, each with or without the addition of silica. At least one catalyst (not shown) may be disposed on or within first catalyst support 148.

Typically, the at least one catalyst may have catalytic activity for removing or decomposing at least one pollutant from air stream 18. Examples of pollutants that may be removed from air stream 18 by the at least one catalyst include ozone, various volatile organic hydrocarbons (VOCs), carbon monoxide, and the like. The at least one catalyst may comprise, as an example, a precious metal, a transition metal, or their metal oxides, or mixtures thereof. Examples of catalysts that may be disposed on or within first catalyst support 148, and which may be capable of removing at least one pollutant from air stream 18 include Pd, Pt, Au, Ag, Ir, Rh, Ni, Co, Mn, Cu, Fe, either in metal or oxide form, or mixtures thereof. In general, catalyst compositions for removal of ozone or other pollutants from air are well known in the art.

Figure 7:
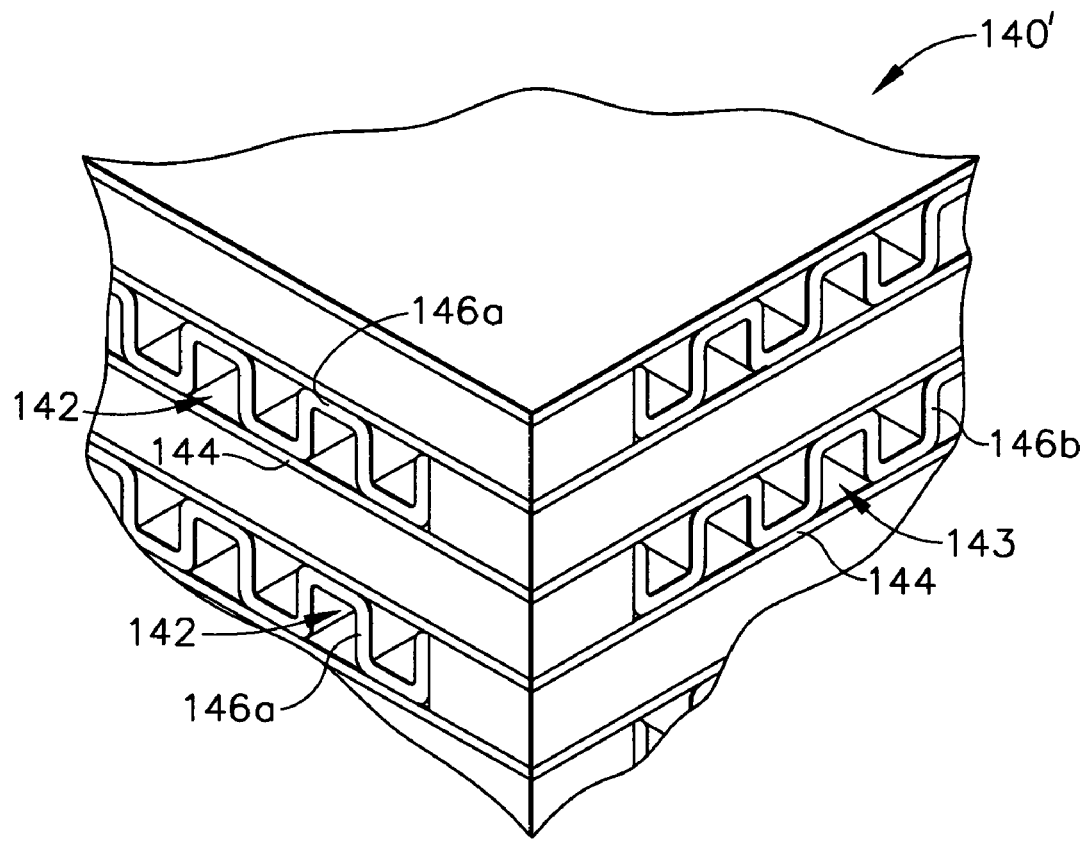
FIG. 7 is a perspective view schematically representing a plate-fin precooler, according to another embodiment of the invention.

FIG. 7 is a perspective view of a portion of a catalytic precooler 140' of plate-fin construction, according to another embodiment of the invention. Catalytic precooler 140' may include a plurality of parallel plates 144, and a plurality of fins 146a, 146b disposed between each pair of plates 144. A first plurality of fins 146a disposed between a first pair of plates 144 may define a plurality of hot pass passages 142. A second plurality of fins 146b disposed between a second pair of plates 144 may define a plurality of cold pass passages 143, wherein hot pass passages 142 are substantially orthogonal to cold pass passages 143. This structure for catalytic precooler 140' may be referred to as a crossflow plate-fin configuration. According to one embodiment of the invention, a first catalyst support 148 may be disposed on the surface of hot pass passages 142, wherein first catalyst support 148 may have at least one catalyst thereon or therewithin, for example, as described with reference to FIG. 6C.

Figure 8A:
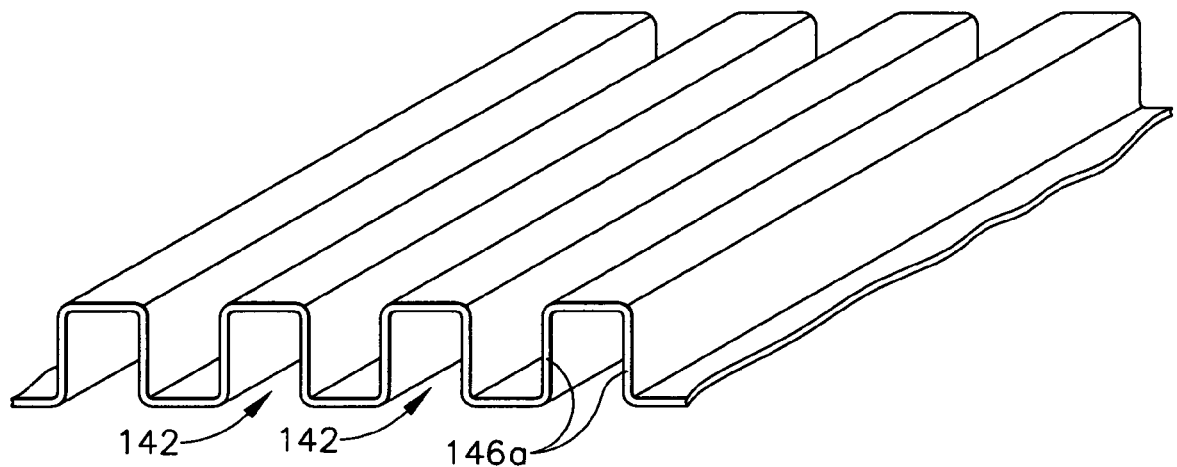
FIG. 8A is a perspective view schematically representing a plurality of straight passages for a plate-fin catalytic device, according to one embodiment of the invention.

FIG. 8A is a perspective view schematically representing a plurality of hot pass passages 142 for a plate-fin catalytic device, according to one embodiment of the invention, wherein the plate-fin catalytic device may be a catalytic precooler 140. Hot pass passages 142 may be defined by a plurality of fins 146a. In the embodiment of FIG. 8A, each hot pass passage 142 may be in the form of a straight, or plane, passage.

Figure 8B:
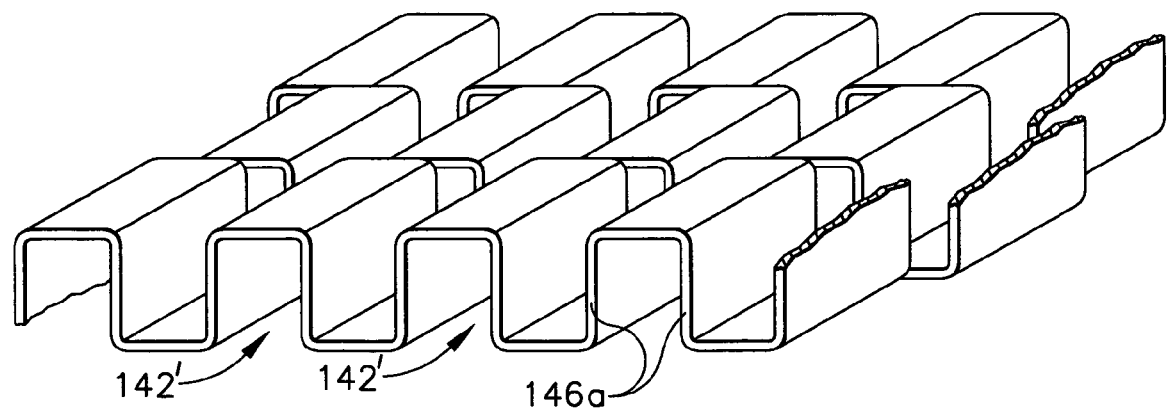
FIG. 8B is a perspective view schematically representing a plurality of off-set passages for a plate-fin catalytic device, according to another embodiment of the invention.

FIG. 8B is a perspective view schematically representing a plurality of hot pass passages 142' for a plate-fin catalytic device, such as catalytic precooler 140, according to another embodiment of the invention. Hot pass passages 142' may be defined by a plurality of off-set fins 146a, such that hot pass passages 142' may be similarly off-set. By off-setting hot pass passages 142' turbulence of air passing therethrough may be increased. Augmentative catalytic device 150 (see, e.g., FIGS. 9A-D) may also have a plate-fin configuration analogous to that shown in FIG. 8A or FIG. 8B.

A first catalyst support 148, having at least one catalyst disposed thereon or therein, may be disposed on the surfaces of hot pass passages 142, 142', essentially as described hereinabove (e.g., with respect to FIGS. 6C, 7). Plates 144 (see, e.g., FIG. 7) are omitted from FIGS. 8A-B for the sake of clarity.

FIG. 9A is a side view schematically representing an augmentative catalytic device 150a, 150b adapted for independent catalytic removal of ozone from an air stream, according to one embodiment of the invention. Augmentative catalytic device 150a, 150b may include axial surface 151.

FIG. 9B is an axial view of augmentative catalytic device 150a of FIG. 9A. Augmentative catalytic device 150a may be of plate-fin construction (see, e.g., FIGS. 7, 8A-B). Augmentative catalytic device 150a may be essentially circular and may have a spiral plate-fin configuration. A single plate-fin layer, for example, comprising a plane metal sheet (or plate 154 (see FIG. 9D)) disposed in contact with a corrugated metal sheet (forming fins 156) may be rolled up to form the spiral configuration of augmentative catalytic device 150a.

FIG. 9C is an axial view of augmentative catalytic device 150b of FIG. 9A, according to an alternative embodiment of the invention. Augmentative catalytic device 150b may have similar characteristics and features as described for augmentative catalytic device 150a, with reference to FIG. 9B. However, augmentative catalytic device 150b may have a concentric ring configuration of plate-fin construction, instead of the spiral configuration of augmentative catalytic device 150a. A concentric ring configuration may be formed by coupling a plurality of concentric rings, each concentric ring being of plate-fin construction, to form the configuration of augmentative catalytic device 150b FIG. 9D is an enlarged axial view of a portion (labeled 150') of augmentative catalytic device 150a, 150b of FIGS. 9B, 9C, respectively, showing fins 156 disposed between plates 154 to define a plurality of channels 152. Fins 156 and plates 154 may each comprise a metal such as stainless steel or aluminum. Channels 152 may be present at a cell density typically in the range of from about 350 to 700 cells per square inch (cpsi) of axial surface 151 of augmentative catalytic devices 150a, 150b, usually from about 400 to 600 cpsi, and often from about 350 to 550 cpsi. Channels 152 may be arranged longitudinally within augmentative catalytic device 150a, 150b. Channels 152 within augmentative catalytic device 150a, or within augmentative catalytic device 150b, may be either straight channels, analogous to straight passages 142a (FIG. 8A), or off-set channels, analogous to off-set passages 142b (FIG. 8B). The plurality of channels 152 may jointly define a plate-fin substrate for a second catalyst support 158 (see FIG. 9E).

FIG. 9E is an enlarged sectional view of a portion of a fin 156 of augmentative catalytic device 150a, 150b, showing second catalyst support 158 disposed on fin 156. At least one catalyst may be disposed on or within second catalyst support 158. Second catalyst support 158 may comprise a material such as alumina, titania, manganese dioxide, or cobalt oxide, each with or without the addition of silica. Second catalyst support 158 of augmentative catalytic device 150a, 150b may be the same as first catalyst support 148, or may be different from first catalyst support 148, of catalytic precooler 140 (see FIG. 6C).

The at least one catalyst disposed on or within second catalyst support 158 may comprise Pd, Pt, Au, Ag, Ir, Rh, Ni, Co, Mn, Cu, Fe, or mixtures thereof. The at least one catalyst disposed on or within second catalyst support 158 may be the same as, or different from, the at least one catalyst disposed on or within first catalyst support 148.

Figure 10:
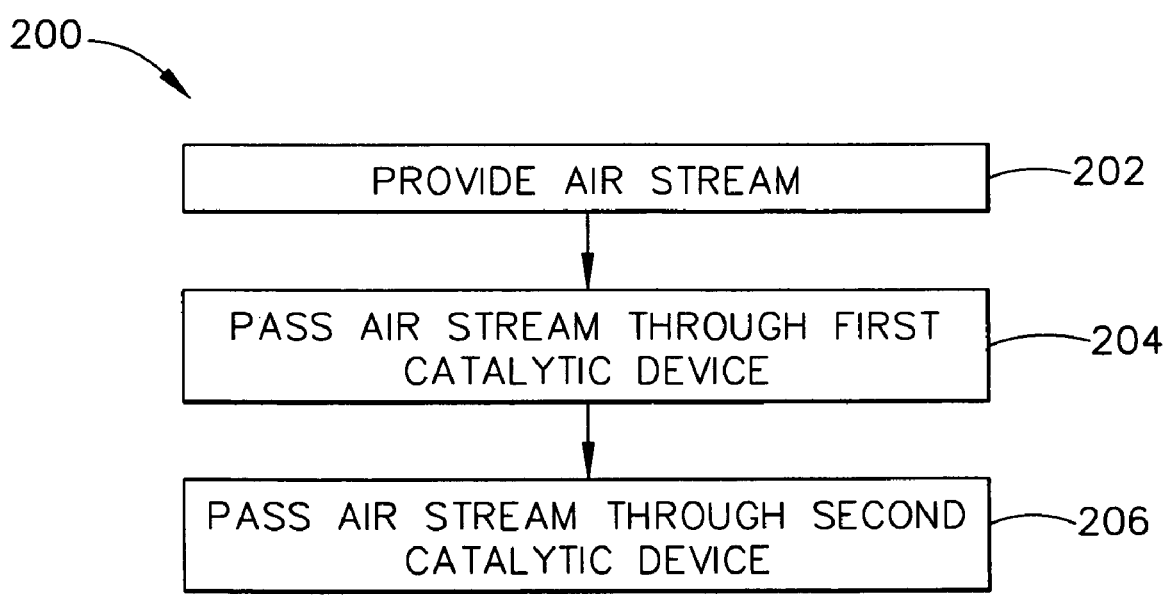
FIG. 10 schematically represents a series of steps involved in a method for providing cleansed air to a cabin of a vehicle, according to another embodiment of the invention.

FIG. 10 schematically represents a series of steps involved in a method 200 for providing cleansed air to a cabin of a vehicle, according to another embodiment of the invention. The vehicle may be powered by at least one gas turbine engine. The vehicle may be a land vehicle, such as a tank for military operations, or a commercial aircraft, such as a wide-body passenger aircraft. The air provided to the cabin may be cleansed by the removal of at least one pollutant, such as ozone, from a stream of air supplied to a catalytic heat exchanger system of an ECS of the vehicle.

Step 202 of method 200 may involve providing an air stream via one or more ducts to an inlet of the catalytic heat exchanger system. The air stream may be provided by a compressor, which may be the compressor of at least one gas turbine engine, or a dedicated air compressor.

Step 204 may involve passing the air stream through a first catalytic device. The first catalytic device may be a catalytic precooler or an augmentative catalytic device. The catalytic precooler and augmentative catalytic device may have those features, elements, and characteristics as described hereinabove, e.g., with reference to FIGS. 2-9E. Thus, the first catalytic device may be adapted for the removal of at least one pollutant, e.g., ozone, from the air stream.

Step 206 may involve, after step 204, passing the air stream through a second catalytic device. The second catalytic device may be a catalytic precooler or an augmentative catalytic device, as described hereinabove. The second catalytic device may be located downstream from the first catalytic device.

Method 200 may provide an ozone conversion efficiency of at least about 85% after operation, i.e., after performing steps 204 and 206, for a period of at least about 30,000 hours, in the absence of any maintenance or cleaning of either the first or the second catalytic device.

Although the invention has been described, inter alia, with respect to ozone removal in an aircraft, the invention may also be applicable to the removal of other pollutants from air, and to land vehicles, as well as the removal of pollutants from air to be supplied to interior air spaces of buildings, and the like.

It should be understood, of course, that the foregoing relates to exemplary embodiments of the invention and that modifications may be made without departing from the spirit and scope of the invention as set forth in the following claims.

We claim:

1. A vehicle, comprising:
   at least one environmental control system for providing conditioned air to a cabin of said vehicle; and at least one compressed air source for providing an air stream to said at least one environmental control system, wherein said environmental control system comprises a catalytic heat exchanger system adapted for cooling said air stream and for catalytically removing at least one pollutant from said air stream, wherein said catalytic heat exchanger system comprises:
a catalytic precooler disposed within a first housing and cooling said air stream, catalytically removing said at least one pollutant, and having an offset cross-flow plate-fin configuration, wherein said offset cross-flow plate-fin configuration increases turbulence of said air stream passing through said catalytic precooler; and
an augmentative catalytic device disposed in series with said catalytic precooler and within said first housing, wherein said augmentative catalytic device catalytically removes said at least one pollutant, wherein said augmentative catalytic device includes a single plate-fin layer and has a spiral plate-fin configuration, and wherein each of said catalytic precooler and said augmentative catalytic device is independently capable of catalytic ozone conversion.

2. The vehicle of claim 1, wherein each of said catalytic precooler and said augmentative catalytic device is independently capable of an initial catalytic ozone conversion efficiency of at least about 80%.

3. The vehicle of claim 1, wherein each of said catalytic precooler and said augmentative catalytic device is independently capable of a second catalytic ozone conversion efficiency of at least about 60% after about 30,000 hours of operation.

4. The vehicle of claim 1, wherein said catalytic precooler and said augmentative catalytic device have a combined second catalytic ozone conversion efficiency of at least about 85% after about 30,000 hours of operation.

5. The vehicle of claim 1, wherein said at least one compressed air source comprises a gas turbine engine.

6. The vehicle of claim 1, wherein said vehicle comprises a commercial wide-body aircraft.

* * * * *